Patented May 22, 1951

2,553,773

UNITED STATES PATENT OFFICE 2,553,773

N-(TRICHLOROMETHYLTHIO) o-SULFO BENZIMIDE AND FUNGICIDAL COMPOSITIONS CONTAINING IT

Charles A. Cohen, Roselle Park, N. J., assignor to Standard Oil Development Company, a corporation of Delaware No Drawing. Application June 4, 1949, Serial No. 97,323

8 Claims. (Cl. 167—33)

This invention relates to new and useful improvements in parasiticidal preparations and more particularly to improved fungicides, insecticides and germicides. This invention also relates to methods of protecting organic material subject to attack by low orders of organisms. This invention further relates to the synthesis of a new chemical compound, N-(trichloromethylthio) o-sulfo-benzimide corresponding to the formula:

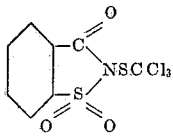

U. S. applications, Serial Nos. 773,925, filed September 13, 1947, now abandoned, and 90,271, filed April 28, 1949, disclose N-thiotrichloromethyl imides of dicarboxylic acids as active parasiticides.

It has now been found that N-(trichloromethylthio) sulfo imides are extremely effective for checking the growth of bacteria, fungi and insects. These new compounds may thus be used as novel ingredients of seed and plant protectants because of their disinfecting action on soil containing harmful organisms.

Suitable sulfo imide compounds of the indicated type are thus illustrated by Formula I below:

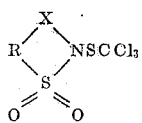

Formula I wherein R is an organic residue which may be aliphatic, aromatic, alicyclic, heterocyclic, and their substituted derivatives, and X is part of an acyl group such as

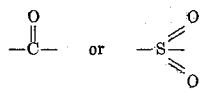

The novel N-(trichloromethylthio) sulfo imide compounds of this invention may be prepared in general by the reaction of perchloromethyl mercaptan (ClSCCl₃), with the corresponding sulfo imide or a metal salt of this compound. Formula II illustrates this reaction between saccharin or a saccharin salt and perchloromethyl mercaptan where M represents hydrogen or a metal:

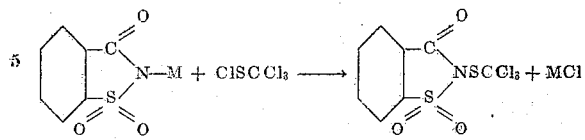

Formula II

The preparation of the sulfo imide starting materials such as saccharin and its metal salts, is well known in the art and is not the subject of this invention and therefore has not been here described.

When the sulfo imide salt is used as a starting material for the production of N-(trichloromethylthio) sulfo imide derivatives of this invention, the salt is first dispersed in a non-reactive organic liquid such as benzene or dioxane and while stirring and heating to about 50°–80° C., an approximately equal molecular quantity of perchloromethyl mercaptan is added over a period of about 1–2 hours. The reaction is continued for about 3–4 hours after all the mercaptan has been added. After cooling, the reaction mixture is filtered to remove the metal halide and any unreacted imide salt and in some cases, a portion of the N-(trichloromethylthio) sulfo imide. The remainder of the N-(trichloromethylthio) sulfo imide is recovered by concentrating the solvent filtrate and recrystallizing the residue from a suitable solvent. Any N-(trichloromethylthio) sulfo imide in the original filter cake may be recovered by washing with water to remove the metal halide and unreacted imide salt. The water-insoluble product may then be further purified by recrystallization from a suitable solvent.

The compounds of this invention can also be prepared by the general method of dissolving the desired imide, without first forming the metal salt, in aqueous alkaline solution, followed by addition of about an equal molecular quantity of perchloromethyl mercaptan. The mixture is stirred rapidly, conveniently, until the aqueous medium becomes neutral or acid to litmus, then filtered and air dried. A high yield of N-(trichloromethylthio) sulfo imide of high purity is thus obtained. The reaction may be carried out at room temperature. In cases where the sulfo imide is readily hydrolyzed in alkaline solution, it may be advantageous to cool the reaction mixture as low as 0° C.

The metal compound used to supply the necessary alkaline solution is a compound of an alkali metal such as lithium, sodium and potassium, and the like. Because of cost factors, sodium and potassium are preferred. The alkali is present preferably in amounts equivalent to the imide used. While other basic compounds may be used, it is desirable to use the alkali hydroxides or carbonates because of the consequent avoidance of the presence of other anion radicals which might have to be removed.

Variations on these procedures can be made, of course. Thus, the alkali metal sulfo imide salts, if available, can be dissolved directly in water and the process further carried on as indicated above for the aqueous solution reaction. The sulfo imides can also be dispersed directly in the organic media and finely divided alkali hydroxide added, thus forming the salt in situ. The process is then further carried on as described above.

Instead of using the sodium saccharin which may normally have from about 5–15% of moisture in it as prepared commercially, saccharin itself having a formula of $C_7H_5O_3NS$ may be used by bringing it into aqueous solution by the addition of either a molal proportion of sodium hydroxide or an equivalent molal proportion of sodium carbonate. In addition to preparing the material in a pure state from either saccharin itself or the sodium saccharin, an inert material may be added, such as finely ground silica or a diatomaceous form of silica such as the filter aids commonly made from raw or semi-purified diatomes, examples of which are available commercially under the name of Hyflo and Dicalite. When these materials are present in a reaction mixture prior to the precipitation of the product by addition of perchloromethyl mercaptan, these materials become intimately mixed with the product and act as an inert diluent which may be later diluted further. The inclusion of materials such as diatomaceous filter aids, aid materially in the rapid filtration of the product and subsequent purification. It is not necessary in the practice of this invention to use pure saccharin or sodium saccharin in a state of purity corresponding to a reagent grade or a USP grade. A product may be employed which approximates a state of purity as low as 80% or 85% purity which is roughly the proportion of o-toluene sulfonyl chloride formed when toluene is sulfochlorinated with chlorsulfonic acid. The 10% or 15% of the parasulfonic acid present in the mixture may be permitted to remain in the subsequent operations in the conversion of the sulfonyl chlorides to a sulfobenzimide without materially detracting from the efficacy of the final material when used for fungicidal purposes.

The following examples are given to illustrate this invention and include both the preparation of N-(trichloromethylthio) o-sulfo benzimide corresponding to the formula:

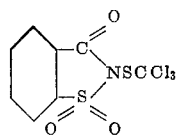

which is made from the cheap and readily available saccharin, and test results obtained on its use as a fungicide.

*Example I*

In a two liter round bottom flask fitted with a high speed stirrer (air turbine), dropping funnel and thermometer were added in the order named: 102.5 grams of sodium-saccharin (soluble-saccharin USP which had been previously dried at a temperature of 105° C. for a period of 18 hours in order to remove all moisture), one thousand ml. of distilled water in which the sodium saccharin was completely soluble and over the course of 40 minutes there was added dropwise 93 grams of perchloromethyl mercaptan. During the addition of the mercaptan, the temperature was maintained at 20°–22° C. and a precipitate of the product was noted as soon as the mercaptan addition began. After all of the mercaptan had been added, the mixture was stirred for an additional 10 minutes and then Büchner filtered. The product which had been precipitated in the form of a fine white powder filtered rapidly and left a dry cake on the funnel. At the completion of the filtration the product was water washed twice with cold water and then permitted to air dry for a period of 16 hours. The weight of the crude product was 241 grams which indicated some moisture remained. The crude material which had a melting point of 143°–144° C., was crystallized from carbon tetrachloride, dried under vacuum and analyzed. The melting point of the crystallized material was found to be 144°–144.5° C. when determined on a Dennis copper bar, and showed the following composition:

|  | Calculated for $C_8H_4O_3S_2NCl_3$ | Found |
|---|---|---|
| Per Cent Carbon | 28.90 | 28.61. |
| Per Cent Hydrogen | 1.21 | 1.32. |
| Per Cent Sulfur | 19.27 | 19.03 (by peroxide bomb). |
| Per Cent Chlorine | 31.98 | 32.21 (by peroxide bomb). |
| Per Cent Nitrogen | 4.21 | 4.17 (by Kjeldahl). |

*Example II*

N-(trichloromethylthio) o-sulfo benzimide was tested for fungicidal activity.

The slide germination technique for fungicidal testing was carried out as described by Wellman and McCallan (Contributions of Boyce Thompson Institute, vol. 3, No. 3, pages 171–176). Against both *Alternaria solani* and *Sclerotinia fructicola*, the fungicidal inhibiting concentration was in the range of from 0.001% to 0.0001%, which is less than the requisite amount of Bordeaux.

The new compound of this invention may thus be applied to various materials to retard or prevent fungus growth and mildew formation. Since it is exceptionally nonphytotoxic, it may be applied safely to a wide variety of plants. Some of the additional materials to which it may be applied for protective purposes are leather, wood, fur, wool, coated fabrics, and other substances.

It may be reduced to an impalpable powder and applied as an undiluted dust or mixed with a solid carrier, such as clay, talc and bentonite, as well as other carriers known in the art (see Frear, "Chemistry of Insecticides, Fungicides and Herbicides"). It may thus be applied as a spray in a liquid carrier, either as a solution in a solvent, or as a suspension in a non-solvent, such as water. When applied as a spray in water, it may be desirable to incorporate wetting agents.

The sulfo imide compound of this invention in general is soluble in organic solvents such as acetone, ethyl alcohol, benzene, naphtha, chlorinated solvents, etc.

The water-soluble wetting agents that may be used in aqueous emulsions comprise the sulfates of long chain alcohols such as dodecanol up to octadecanol, sulfonated amide and ester derivatives, sulfonated aromatic and mixed alkyl-aryl sulfonate derivatives, esters of fatty acids such as the ricinoleic acid ester of sorbitol, and petroleum sulfonates of $C_{10}$ to $C_{20}$ length. The non-ionic emulsifying agents such as the ethylene oxide condensation products of alkylated phenols may also be used. It is to be understood that these non-ionic emulsifying agents such as the ethylene oxide condensation products of alkylated phenols may also be used. It is to be understood that these and similar compounds are intended when the term "wetting agent" is used hereafter.

The compound of this invention may also be admixed with carriers that are themselves active, such as other parasiticides, hormones, herbicides, fertilizers and wetting agents. Stomach and contact insecticides such as the arsenates, fluorides, rotenone, and the various fish poisons and organic insecticides, such as di(p-)chlorophenyl-trichloroethane, benzene-hexachloride and similar products may also be advantageously added.

This invention has been described with respect to preferred embodiments but is not intended to be limited thereby.

What is claimed is:

1. As a new chemical compound, N-(trichloromethylthio)o-sulfo benzimide corresponding to the formula:

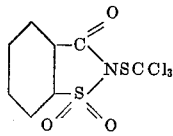

2. A fungicidal dust composition comprising N-(trichloromethylthio)o-sulfo benzimide corresponding to the formula:

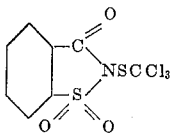

admixed with a powdered clay.

3. A fungicidal dust composition as in claim 2, in which the clay is bentonite.

4. A fungicidal composition containing N-(trichloromethylthio)o-sulfo benzimide corresponding to the formula:

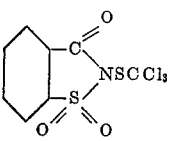

as the active ingredient admixed with a surface-active dispersing agent which lowers the surface tension of water and thereby promotes aqueous colloidal dispersions of the benzimide.

5. A fungicidal composition as in claim 4 in which the dispersing agent is a surface tension reducing agent for water selected from the group consisting of long-chain alcohol sulfates, sulfonated amide derivatives, sulfonated ester derivatives, sulfonated aromatic derivatives, sulfonated alkyl-aryl derivatives and petroleum sulfonates of $C_{10}$ to $C_{20}$ length.

6. A fungicidal composition comprising N-(trichloromethylthio)o-sulfo benzimide corresponding to the formula:

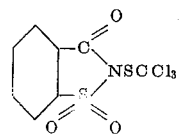

as the active ingredient dissolved in a solvent therefor.

7. A fungicidal composition comprising N-(trichloromethylthio)o-sulfo benzimide corresponding to the formula:

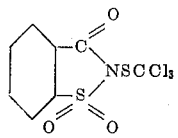

as the active ingredient admixed with a solid, powdered, inert diluent.

8. A fungicidal composition comprising as the active ingredient N-(trichloromethylthio)o-sulfo benzimide corresponding to the formula:

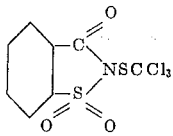

contained in an aqueous emulsion with a wetting agent.

CHARLES A. COHEN.

No references cited.